Oct. 31, 1939.  L. G. SROGI  2,177,913
VEHICLE BRAKE
Filed March 11, 1938  2 Sheets-Sheet 1
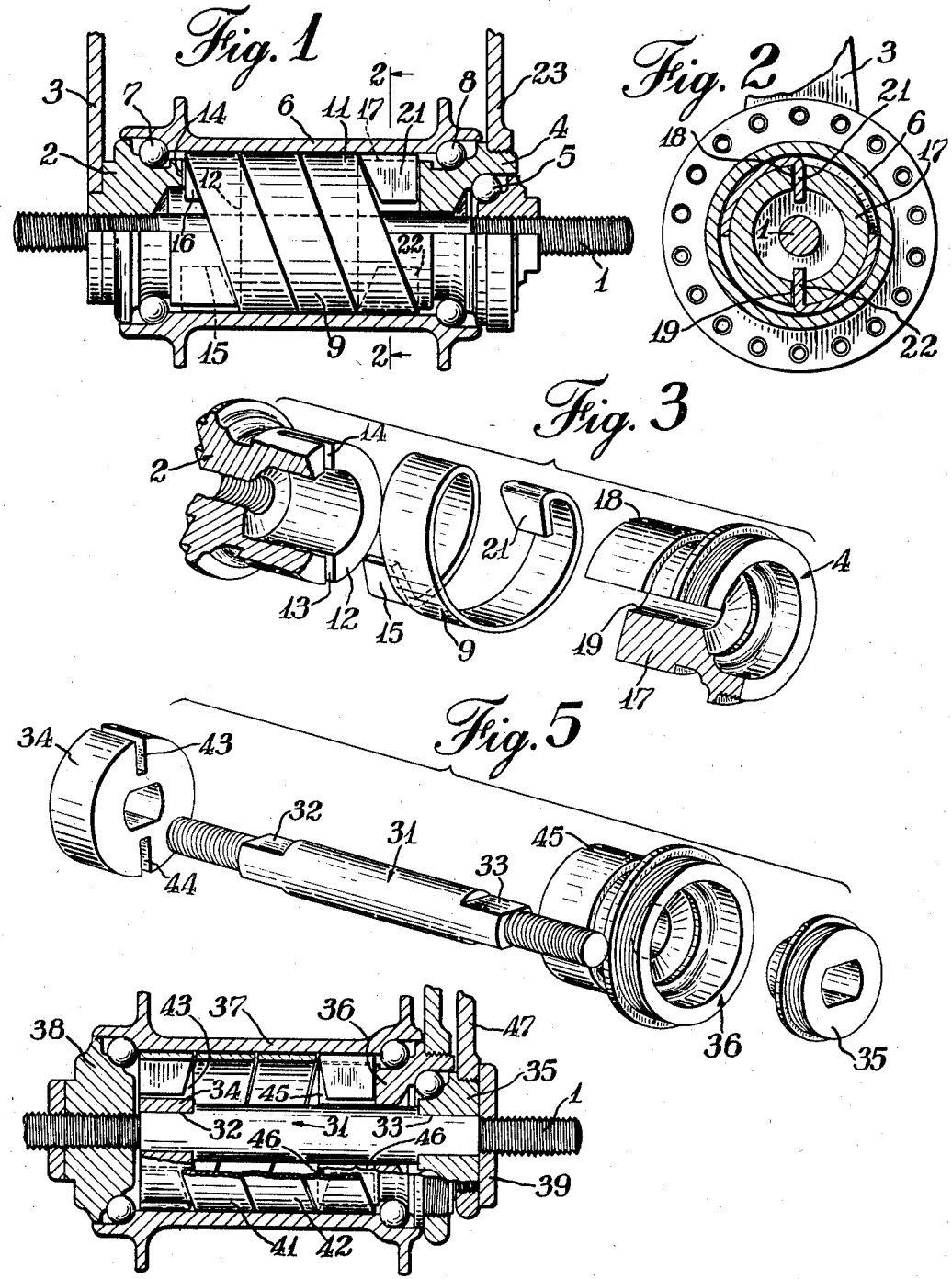
INVENTOR.
Ladislaw G. Srogi
BY Clinton S. Janes
ATTORNEY.
Witness:
Burr W. Jones Oct. 31, 1939.　　　L. G. SROGI　　　2,177,913
VEHICLE BRAKE
Filed March 11, 1938　　2 Sheets-Sheet 2
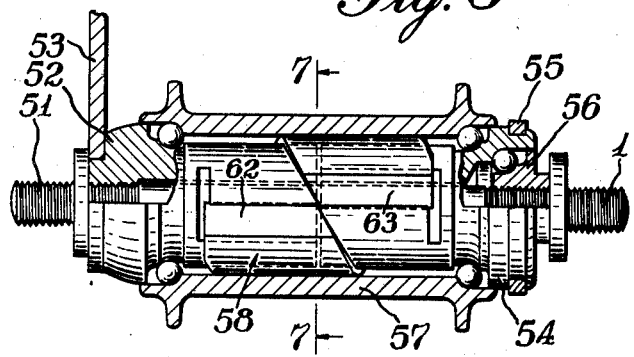
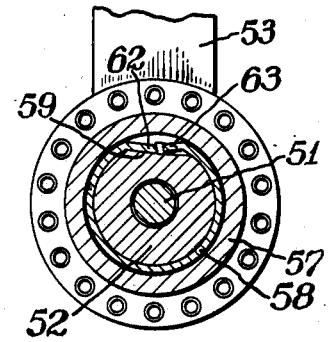
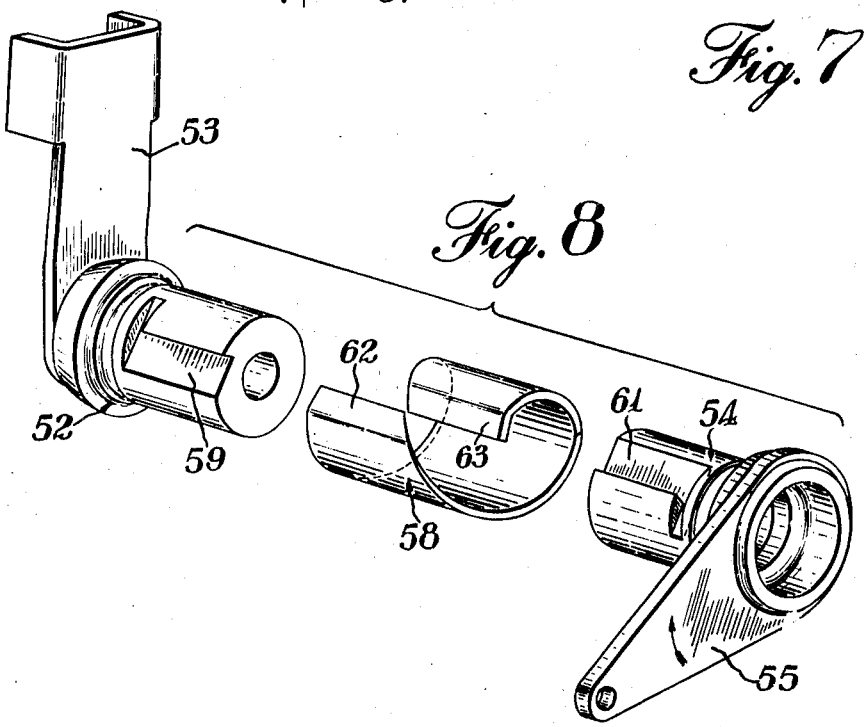
Witness:
Burr W. Jones
INVENTOR.
BY Ladislaw G. Srogi
Clinton S. Janes
ATTORNEY.

Patented Oct. 31, 1939

2,177,913

UNITED STATES PATENT OFFICE 2,177,913

VEHICLE BRAKE

Ladislaw G. Srogi, Elmira, N. Y., assignor, by mesne assignments, to Bendix Aviation Corporation, South Bend, Ind., a corporation of Delaware Application March 11, 1938, Serial No. 195,341

3 Claims. (Cl. 188—26)

The present invention relates to vehicle brakes and more particularly to front wheel brakes for velocipedes and the like.

Since front wheel brakes for velocipedes such as bicycles are ordinarily operated manually from some form of operating device on the handle bar of the vehicle, it is desirable that the brake should be considerably more sensitive than the pedal-operated rear wheel brake. It has been proposed to secure such sensitivity by various forms of so-called "servo" arrangements whereby the brake is more or less self-tightening in its action. It has been found to be difficult, however, to design a servo or self-energizing brake fulfilling the desired space and weight requirements which does not have a tendency under some conditions to lock or seize, causing the operator to dismount or even be thrown from the vehicle.

It is an object of the present invention to provide a novel wheel brake for velocipedes or the like which is efficient in operation, sensitive to control and free from any tendency to seize or lock.

It is another object to provide such a device which is simple and economical in construction, of small size and light weight.

It is another object to provide such a device which utilizes as a braking surface substantially the full interior surface of the wheel hub.

It is a further object to provide such a device in which the braking pressure is substantially evenly distributed over the entire braking surface.

It is another object to provide such a device in which the parts are of simple design and largely interchangeable while being so formed that correct assembly is easy, and incorrect assembly impossible.

Further objects and advantages will be apparent from the following description taken in connection with the accompanying drawings in which:

Fig. 1 is a side elevation partly in section of one preferred embodiment of the invention;

Fig. 2 is a section taken substantially on the line 2—2 of Fig. 1;

Fig. 3 is a detail in perspective of certain of the brake applying members, partly broken away and shown in disassembled relation;

Fig. 4 is a view similar to Fig. 1 showing a modified arrangement of the axle and brake applying members;

Fig. 5 is a detail in perspective of the axle and certain of the brake controlling members shown in Fig. 4, in disassembled relation;

Fig. 6 is a side elevation partly in section of a further embodiment of the invention;

Fig. 7 is a section taken substantially on the line 7—7 of Fig. 6; and

Fig. 8 is a detail in perspective of the brake member and actuating elements shown in Fig. 6, in disassembled relation.

In Fig. 1 of the drawings, there is illustrated an axle 1 adapted to be fixedly mounted in the frame of the vehicle, not illustrated. An anchor member 2 is mounted on the axle and prevented from rotation thereon in any suitable way as by means of a torque arm 3 adapted to be anchored to the vehicle frame. A control member 4 is journalled on the axle 1 as by means of bearings 5, and a wheel hub 6 is rotatably mounted on the anchor member 2 and control member 4 by means of bearings 7 and 8 respectively.

The interior of the hub 6 is formed as a substantially smooth cylindrical surface, and means for frictionally engaging such surface to retard the rotation of the wheel are provided in the form of a plurality of flat spiral spring members. As here shown, there are two such spring brake members 9 and 11 having convolutions so spaced as to permit the springs to be interthreaded.

The anchor member 2 is provided with a projecting sleeve or skirt 12 extending within the brake members 9 and 11 and provided with radial recesses or slots 13 and 14 adapted to receive the inturned ends 15 and 16 of spring brake members 9 and 11 to anchor the same against rotation. The control member 4 is provided with a similar skirt 17 having radial slots 18 and 19 adapted to receive the opposite inturned ends 21 and 22 of the brake members 9 and 11 and transmit angular movements of the control member thereto.

Means for angularly adjusting the control member 4 for expanding the brake members into engagement with the hub is provided in the form of an operating arm 23 which is arranged for manual operation in any suitable manner, not illustrated.

The brake members 9 and 11 are preferably formed with an external diameter slightly smaller than the internal diameter of the hub 6 so that they normally bear on the skirts 12 and 17 of the anchor member 2 and control member 4, without engaging the interior of the hub.

In the operation of this embodiment of the invention, actuation of the control member 4 by the operator in a direction to unwind the brake members causes them to expand into engagement with the interior of the hub and apply a braking force thereto dependent upon the unwinding action of the control member. The braking forces thus transmitted through the members 9 and 11 to the fixed anchor member 2 cause the brake members to expand into closer engagement with the hub 6 and thus increase the braking effect. The stiffness of the brake members is, however, sufficient to prevent locking up of the brakes so that they remain at all times in complete control of the operator.

In the embodiment of the invention illustrated in Figs. 4 and 5, the structure is substantially similar except that the axle 31 is provided with flattened or "double-D" sections 32 and 33 fitting similar apertures formed in an anchor member 34 and a bearing member 35.

A control member 36 is journalled on the bearing member 35, and a hub 37 is rotatably mounted on the control member 36 and on a second bearing member 38 adjustably mounted on the axle 31. The bearing member 35 is retained on the axle by a nut 39, while the anchor member 34 is retained by the bearing member 38.

A pair of spiral spring brake members 41 and 42 are mounted at their ends on the anchor member 34 and the control member 36, being non-rotatably connected thereto by inturned ends on the springs entering radial slots 43 and 44 in the anchor member, and 45 and 46 in the control member.

The operation of this embodiment of the invention is similar to that first described with the exception that the braking torque applied to the anchor member 34 by the brakes 41 and 42 is transmitted through the axle 31 to the bearing member 35 which is prevented from rotation by means of a torque arm 47 attached to the frame of the vehicle, not illustrated, in any suitable manner.

It will be noted that by reason of the use of a pair of spring brake elements having their anchored ends on opposite sides of the anchor and control members, the stresses exerted thereby are substantially balanced and the braking pressures are substantially uniform throughout the entire interior surface of the hub. It will be further understood that the sensitivity of the brake and the amount of servo action incorporated therein can be readily varied by altering the number of turns in the spring brake members, as well as by varying the stiffness of the material forming the brake members.

In the embodiment of the invention illustrated in Figs. 6, 7 and 8, an axle 51 has mounted thereon an anchor member 52 which is prevented from rotation by a torque arm 53 adapted to engage the frame of the vehicle, not illustrated. A control member 54 provided with an operating arm 55 is journalled on the axle by means of an adjustable bearing member 56, and a wheel hub 57 is rotatably mounted on the anchor and control members.

In this embodiment of the invention, a single spring brake member 58 in the form of a spiral sleeve is mounted in the hub 57, bearing at its ends on the anchor member 52 and control member 54. Tangential recesses 59 and 61 (Fig. 8) are formed in the peripheries of the anchor member and control member respectively forming abutment shoulders for the inturned ends 62 and 63 respectively of the brake sleeve 58.

In operation, actuation of the control member 54 in a clockwise direction as viewed in Fig. 8 causes the sleeve 58 to be expanded into engagement with the interior of the hub 57. It will be readily appreciated that the conformation and mode of application of the brake 58 causes a substantially uniform braking pressure to be exerted over the entire interior surface of the hub 57, which pressure is increased by the self-energizing action of the brake, while being at all times completely under the control of the operator.

Although certain embodiments of the invention have been shown and described in detail, it will be understood that other embodiments are possible and various changes may be made in the design and arrangement of the parts without departing from the spirit of the invention as defined in the claims appended hereto.

What is claimed is:

1. In a hub brake structure for velocipedes, an axle, an anchor member non-rotatably mounted thereon having an axially arranged cylindrical portion, a control member rotatably mounted on the axle having a corresponding axially arranged cylindrical portion, said cylindrical portion having oppositely arranged recesses, a plurality of helical spring members mounted on and conforming to said cylindrical portions with their ends abutting in said recesses, a cylindrical hub journalled on said anchor and control members, enclosing said springs, and manually operable means for rotating the control member to expand the springs into frictional engagement with the interior of the hub.

2. In a hub brake for vehicles, an axle, a bearing member non-rotatably mounted on one end thereof, a torque arm preventing rotation of the bearing member, a second bearing member adjustably mounted adjacent the other end of the axle, an anchor member non-rotatably mounted on the axle adjacent thereto, a manually operable control member journalled on the first bearing member, a hub rotatably mounted on the control member and second bearing member, and a flat spiral spring within the hub having its ends anchored to the control and anchor members respectively.

3. In a hub brake for vehicles, an axle, a bearing member rigidly fixed on one end thereof, a torque arm preventing rotation of the bearing member, a second bearing member adjustably mounted adjacent the other end of the axle, an anchor member non-rotatably mounted on the axle adjacent thereto, a manually operable control member journalled on the first bearing member, a hub rotatably mounted on the control member and second bearing member, said control member and anchor member having longitudinal peripheral abutments rigid therewith, and a spiral spring in the hub having abutments at its ends resting against the abutments of the control and anchor members.

LADISLAW G. SROGI.